United States Patent [19]

Heier et al.

[11] 4,004,677
[45] Jan. 25, 1977

[54] LINE COMBINING APPARATUS

[75] Inventors: Robert J. Heier, Whitehouse, Ohio; Wayne E. Pettibone, Woodridge, Ill.

[73] Assignee: Owens-Illinois, Inc., Toledo, Ohio

[22] Filed: July 30, 1975

[21] Appl. No.: 600,248

[52] U.S. Cl. .............................. 198/452; 198/461; 198/728

[51] Int. Cl.² ........................................ B65G 47/26

[58] Field of Search ........................ 198/32, 34, 76

[56] References Cited

UNITED STATES PATENTS 2,829,757  4/1958  Breeback ........................ 198/32 X
3,901,375  8/1975  Rague ........................... 198/34

Primary Examiner—Evon C. Blunk
Assistant Examiner—Douglas D. Watts
Attorney, Agent, or Firm—John R. Nelson

[57] ABSTRACT

The invention discloses a line-combiner apparatus for receiving two lines of packages in a production line, such as six or eight packs of containers filled with a beer or beverage product, and combining them into a single line of packages without interference and at rates on the order of 200 pieces per minute. The packs delivered from two wrap machines are carried by separate infeed conveyors in the initial section of the apparatus driven at a speed to randomly space packages in each of the lines. The second section of the apparatus includes individual chains engaging the bottom of packages of each line and the chains each have spring-loaded fingers spaced therealong which protrude in the plane of the packages at predetermined spacings. The finger-carrying chains running at the same speed have their fingers 180° out of phase with each other so that the fingers are alternately spaced (staggered). The two finger chains engage the packages and feed them to a third section, a single belt traveling faster than the chains, and the staggered position of the packages results in single lines thereof at regular staggered intervals on the two belts. The increased speed of each of the belts pulls the packages from the two chains eliminating finger interference at transfer. The two lines of packages are fed onto a single conveyor and guided divergently into a single line of packages. The spring-loaded finger lugs will depress below the chain surface should the lug happen to come up under a package.

7 Claims, 9 Drawing Figures

LINE COMBINING APPARATUS

The present invention relates to handling of packages produced in two or more lines, such as six or eight packs of filled containers delivered single line from two or more wrap machines, for orienting the packages and forming them into a single line without interference. The single line is thereafter processed through a tray packer device, or the like.

BACKGROUND OF THE INVENTION

The bottling or filling of containers, bottles or cans, in a "bottling plant" involves the processing of the individual containers into and through a multi-wrap machine. This machine receives the containers, groups them in two lines and forms successive groups of six or eight containers, and wraps the groups in succession to form what is referred to in the market as a "six pack" or "eight pack" of the product. The output of the wrap machine is delivered to a tray packer in which either four or three of either the six or eight packs, respectively, are placed in a carton, referred to as a tray, having shallow sides and a bottom (usually open at the top). Once in the tray, the packages are placed on pallets and handled in the distribution or warehousing system of the bottler. The bottling plant normally produces the packs (six or eight) on two multi-wrap machines to feed a single tray packer in a production line flow and without interruption.

SUMMARY OF THE INVENTION

It is the object of the present invention to feed the output of two container wrapping machines, which are not synchronized, and orient the random packs produced by them in such a fashion they may be merged into a single line for handling in packaging machines downstream in the production line from the wrap machines. The invention achieves a continuous motion machine for high speed production, as distinguished from prior art machines operated in a mode of interruption of flow of given lines alternately to achieve merger and spacing in a single line.

The invention includes a mechanism built into the line which will handle packs either spaced apart or in abutting back-to-back relationship and separate them in an acceleration segment of the line and then cause the packs to be spaced in suitable fashion on the main line segment of the unit. Experience has enabled production at 200 or so eight packs of product per minute. Present line speeds using prior art machinery are much less.

Also, the invention provides a finger-lugged chain device for spacing and propelling packages on one of the conveyor spans for orienting the packages comprising a spring-loaded device coupled into the chain of this conveyor which will yield if it should enter the span under a package and slide underneath it to advance to a package ahead and propel such a package in a predetermined, spaced relation to other packages in the lines.

The invention comprises multiple conveyor lines each receiving packages from a processing machine, such as a multiwrap machine. The initial span of each line receives the packages at random spacing and is propelled at a forward speed greater than the infeed thereto from the machine. A second span of the conveyor, adjacent such first span, includes a chain brought up from beneath the packages being delivered onto the second span from the first, and the chain has upwardly protruding spring-loaded fingers connected thereon at predetermined spacings. The finger-lugged chain is driven faster than the supporting belt of the conveyor for the packages so that the fingers of the chain each catch up to and engage a rear edge of a package; whereupon the finger slides the package forward over the belt causing the packages to be uniformly separated and spaced in each second span. The two lines in the example herein disclosed are timed so that the finger chains of each are 180° out of phase with each other. The last, third span of the two lines, employs a belt conveyor traveling slightly faster than the finger chain span, which causes the packages to be carried from the finger chain span in an accelerated manner. In essence, the third span pulls the packages from the finger chain so as to avoid any interference as the finger chain turns over the end sprocket to the underneath return travel of the chain.

The invention will now be described in a preferred embodiment with reference to the accompanying drawings.

DETAILED DESCRIPTION

Figure 1:
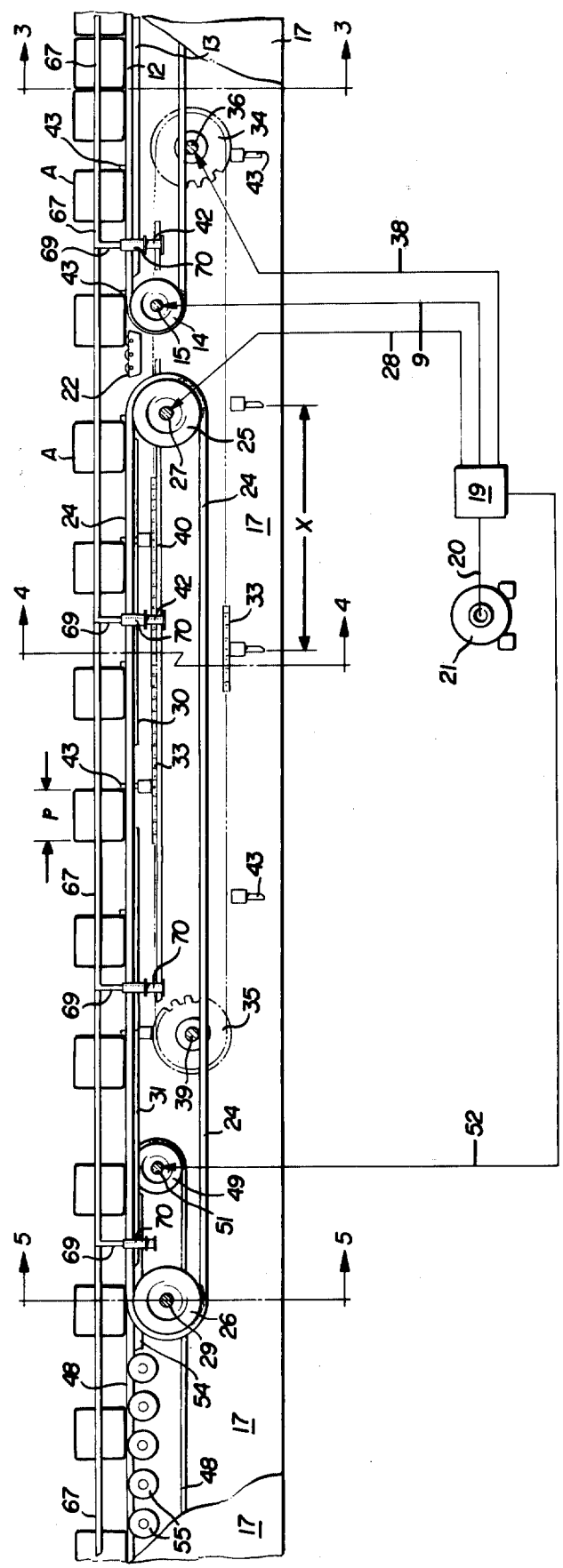
FIG. 1 is a side elevational view, with parts broken away, showing the three spans of conveyor in part, certain parts of the drive being illustrated schematically.
Figure 2:
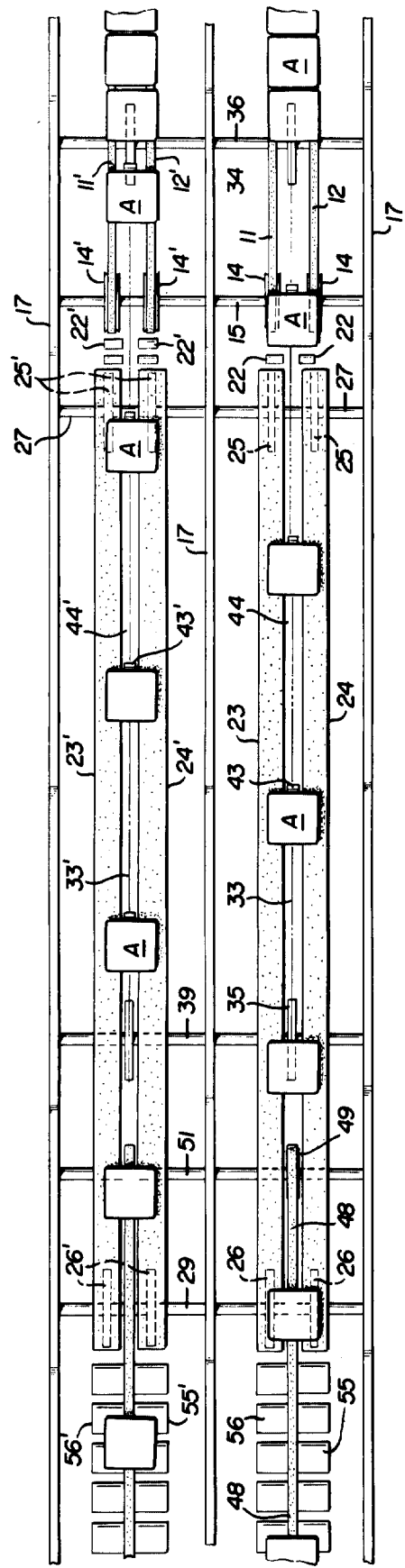
FIG. 2 is a plan view of the infeed initial span of the conveyor line of the invention and includes the second span illustrating spacing of the packages, alternately (staggered), as between the two conveyors.
Figure 2A:
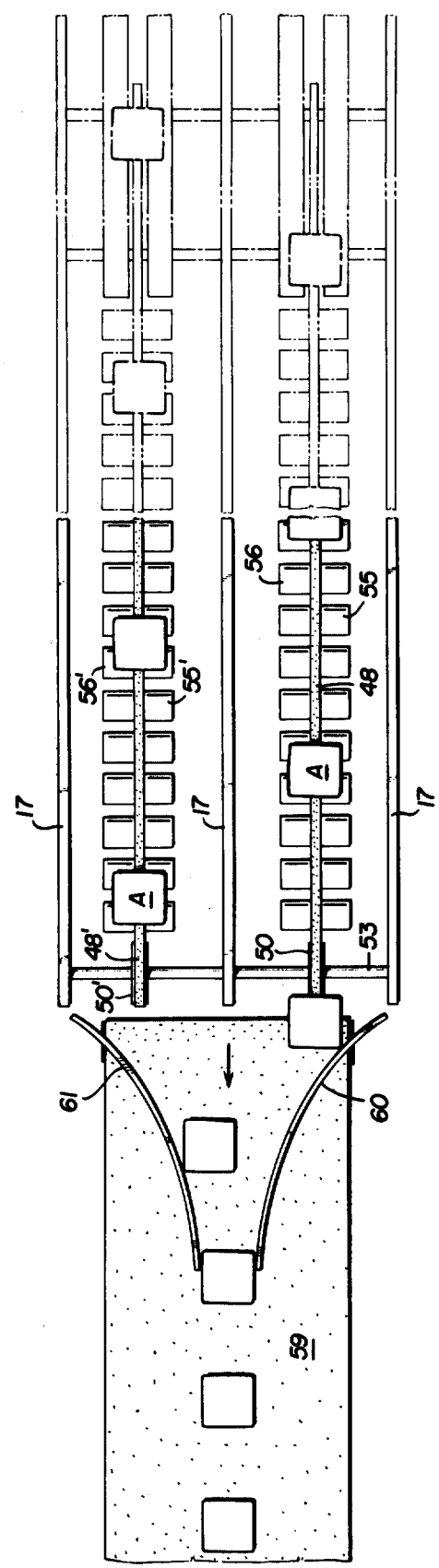
FIG. 2A is a plan view of the balance of the conveyor line of the invention shown on FIG. 2.
Figure 3:
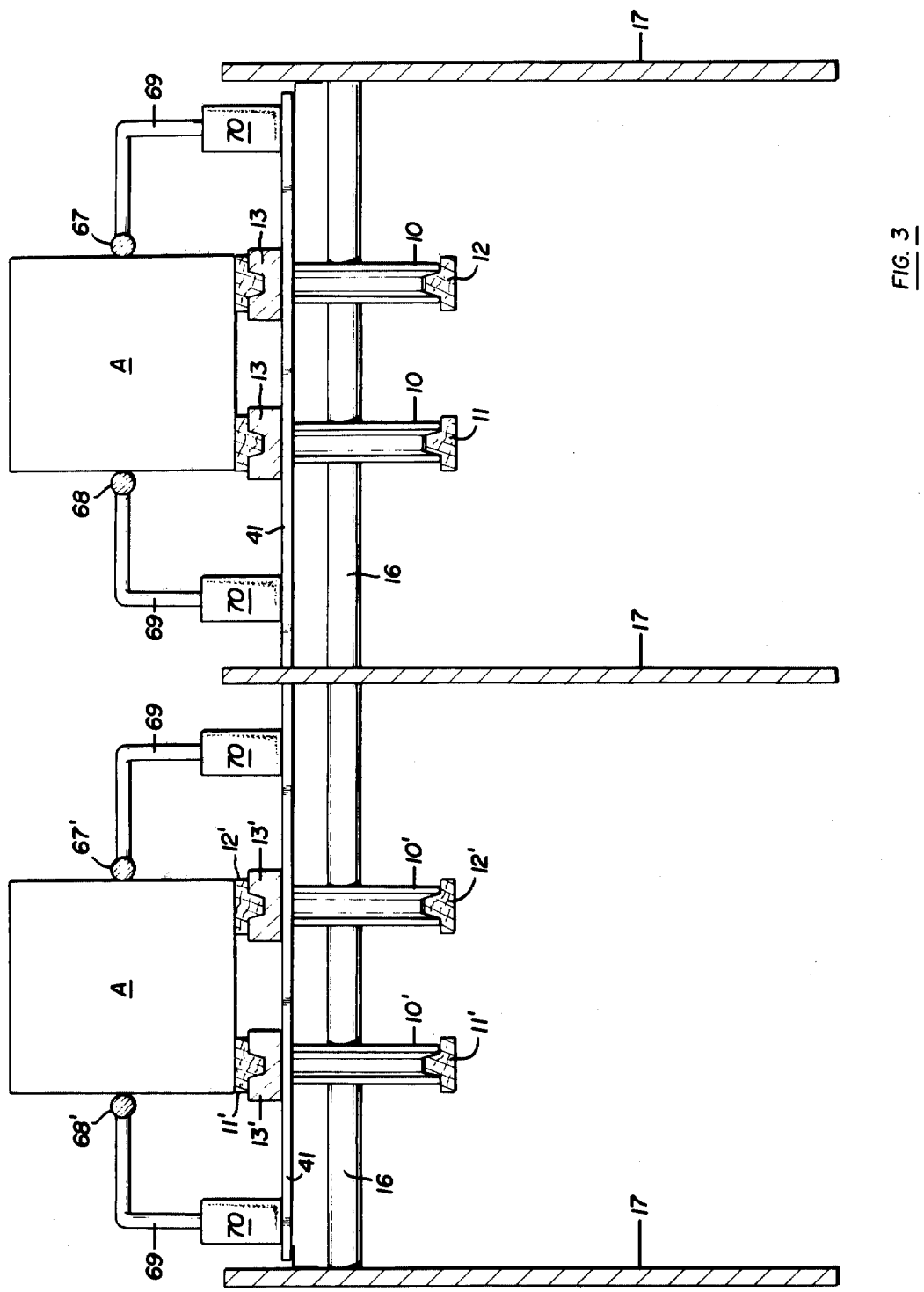
FIG. 3 is an end sectional elevational view taken along line 3—3 on FIG. 1.

Referring to the FIGS. 1, 2 and 2A, packages formed on a multi-wrap machine (not shown) are delivered to an infeed or first conveyor of the line for each such machine. There are two lines illustrated, the parts which are common to both lines are referenced by the same numeral, the distinction between them being denoted by a prime numeral designation, such as the near or bottom conveyor belt on FIG. 2 being 12 and the other corresponding belt of the top conveyor being 12'. Insofar as the conveyors are the same, the description of but one conveyor will be given. The packages A are transferred onto two spaced apart belts 11 and 12 which run over the belt guides 13 on their upper span and are reeved for endless travel around the sets of end pulleys 10 and 14 (FIGS. 1 and 3). A common shaft 15 is rotatably mounted in the vertical members of frame 17 of the conveyor line, and as shown schematically on FIG. 1, shaft 15 is connected by a drive means 9 to a drive transmission 19 receiving power through drive connection 20 from a drive motor 21. Pulleys 10 are rotatably mounted on shaft 16 (FIG. 3).

Figure 4:
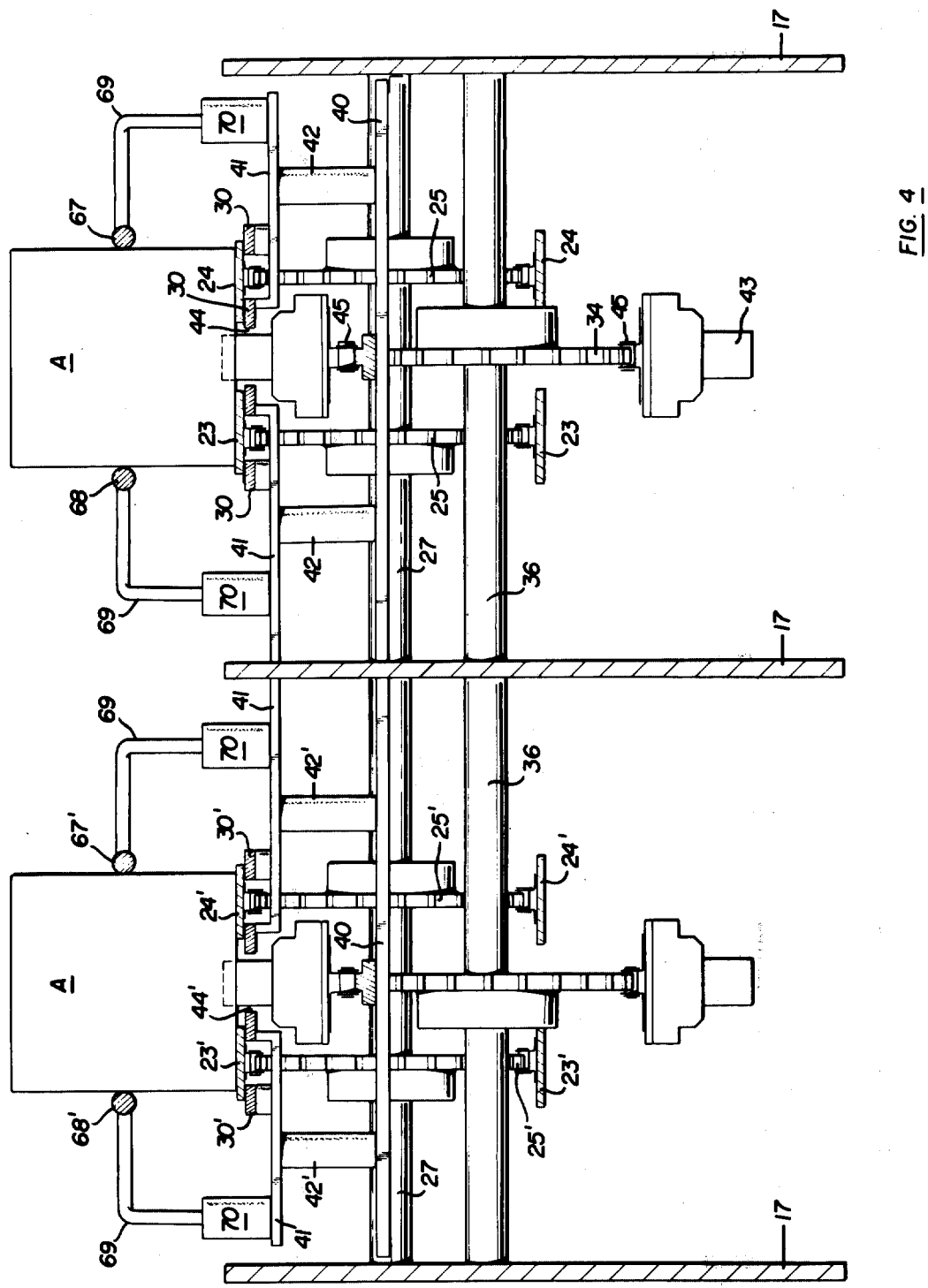
FIG. 4 is an end sectional elevational view taken along line 4—4 on FIG. 1.
Figure 5:
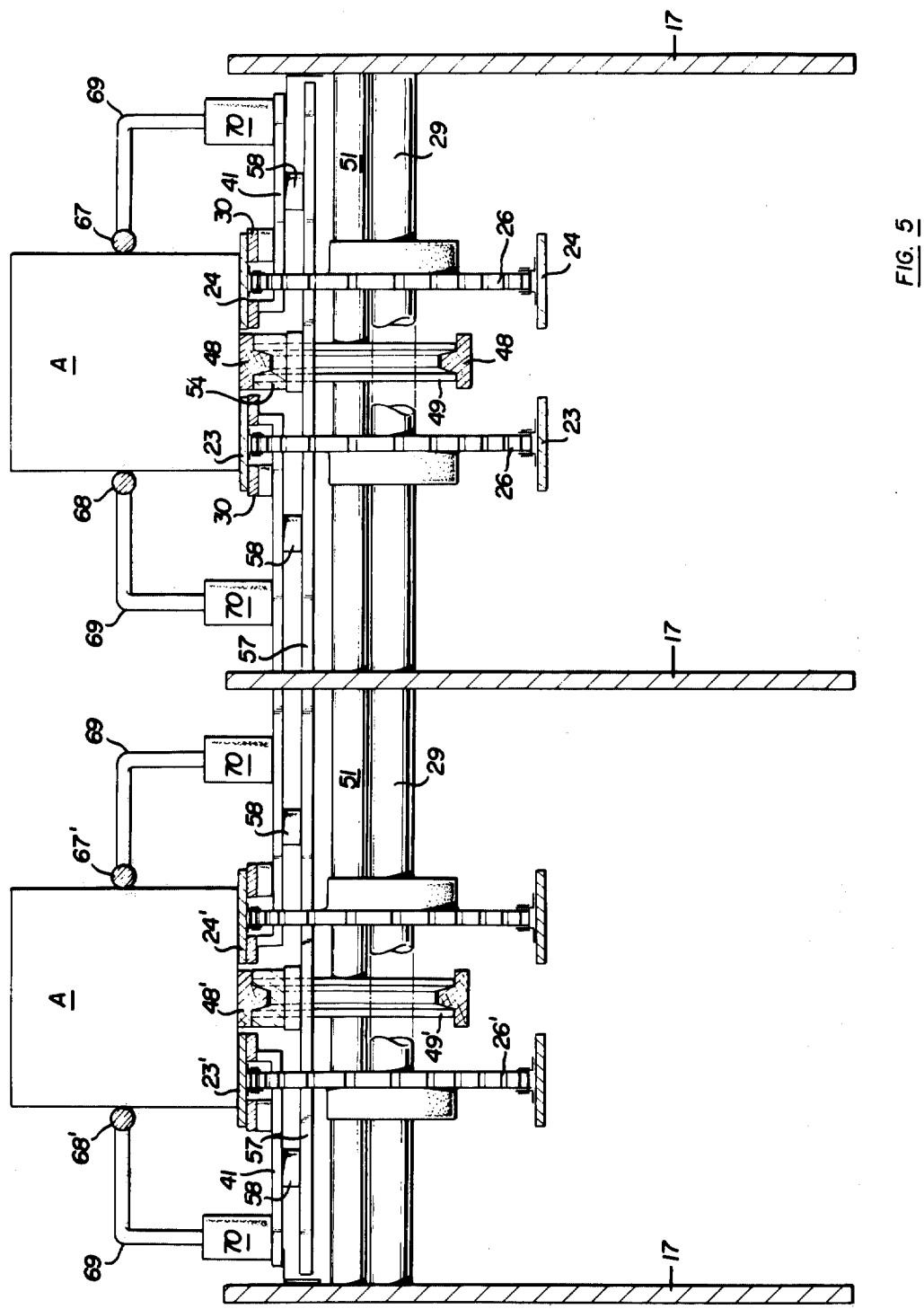
FIG. 5 is an end sectional elevational view taken along line 5—5 on FIG. 1.

Beyond the downstream end of the belts 11 and 12 is a short span of a roller or skate conveyor 22 which receives the packages A traveling beyond the end of belts 11 and 12 at their end turn travel around sprockets 14 back to the underside of the endless path for the belts. Adjacent the outlet of skate sections 22 is a second span of belt conveyor 23 and 24 each running on their end pulleys 25 and 26 in an endless path. Belts 23 and 24 are wider than the first span of belts 11 and 12 to lend more stability to the packages as they are picked up and advanced thereon. Pulleys 25 are fastened on power shaft 27 which is connected by a suitable drive means 28 to the power transmission 19. Pulleys 26 are rotatable on shaft 29 held in the longitudinal members of frame 17. Both belts 23 and 24 run on end-to-end, spaced-apart elongated guide surfaces 30 (FIGS. 4 and 5) supported by the upper horizontal plate 41 of the conveyor frame. The belts 23 and 24 are transversely spaced to provide an elongated slot 44 therebetween. Beneath the aforementioned slot 44 is an endless chain 33 reeved over the respective end sprockets 34 and 35. Sprockets 34 are fastened on power shaft 36 rotated by drive means 38 from the power transmission 19. Sprockets 35 are rotatable on transverse shaft 39 (FIG. 1) held between the vertical longitudinal members of frame 17. Chain 33 in its upper reach travels on the horizontal chain guide surface 40. The guide 40 is a horizontal plate connected with the longitudinal members of frame 17 and the upper horizontal plate 41 by several spacer members 42 (FIG. 4) which may be fastened to the spaced plates by known means, such as welding. The chain 33 includes links 45 (FIG. 6) at predetermined spacing therealong which carry finger lugs 43, to be presently described more in detail.

Referring to FIGS. 1 and 2, packages A are being propelled from right to left in random spacing, such as shown at the three right hand packages, by the conveyor 11, 12 running at a constant speed consistent with the output of a wrap machine or the like. As each package A approaches a point approximately overlying the end sprocket 34, a finger lug 43 on the chain 33 will turn over the sprocket reversing its path with the chain 33 and enter the top run thereof protruding upwardly through the slot 44 and above the level of belts 23, 24. Assuming for the moment the end of lug 43 comes up in a space between two packages A, as shown near the right hand side of FIGS. 1 and 2, the drive means 38 for the chain 33 operates it at a constant speed that is faster than the running speed of conveyor 11, 12; and, accordingly, at some point in the travel of its upper span, lug 43 of the chain will catch up with the trailing side of a package A and engage the latter. This will usually occur before the skate wheel segment 22 and lug 43 will thereafter drive the package A forward over skate segment 22 and along the upper reaches of belts 23, 24 which will support the package. The chain 33 will also travel at a slightly higher linear speed than the belts 23, 24 keeping the packages A under positive control of the lug spacing.

At the point where the lug 43 nears disengagement with the package by chain 33 traversing the sprocket 35 on the downstream end turn, there is a third belt 48 which has its upper span running in the slot 44 as a continuation of the path of chain 33. Belt 48 engages the forward edge of a package supported on belts 23, 24. Belt 48 is a single endless conveyor belt shown best on FIG. 5 as a V-belt reeved about pulleys 49 and 50 (FIG. 2A). Pulley 49 is keyed on a drive shaft 51 supported in the frame 17 and is drivingly connected by a drive means 52 to the power transmission 19. Pulley 50 is an end turn idler and is rotatably mounted on shaft 53 supported at the downstream end of the vertical frame members 17.

Before the end of the span of belts 23, 24, and at the end turn therefor provided by pulley 26, the slope of belt 48 rises slightly on the guide 54 provided by a horizontal plate 57. Plate 57 is connected with the parallel, horizontal plate 41 of the conveyor framework by spacers 58 fastened therebetween. The guide elevates belt 48 from slightly below the level of 23, 24 to a level just above it to grip the underside of the package A before the pulley 26 end turn; and, accordingly, the load is transferred from belts 23, 24 to belt 48. Belt 48 is traveling slightly faster than the lugged chain 33 and the belts 23, 24, such that packages A are carried away from the chain lug 43 at an accelerated manner, i.e., the package is pulled from the lug 43 so as to cause no interference at the time that lugged chain 33 goes over the end sprocket 35 to the underside reach of its path.

Beyond belts 23, 24 the belt 48 runs between sets of rollers 55 and 56 on either side of the belt and at about the same elevation. (Belt 48 is slightly higher to assure frictional engagement with the bottom of each of the packages.) Rollers 55 and 56 are free rotating rollers used to support the load of packages, which at this point are propelled forward by power belt 48.

Referring to FIG. 2A, the packages leave this segment of the conveyor at the end of belts 48, 48' and transfer two lines of packages onto a collector belt 59 which serves as an infeed conveyor into a tray packer (not shown), or palletizer or the like. Two converging arcuate guides 60 and 61 are mounted over the top of belt 59 by suitable stationary supporting means (not shown) so as to engage the packages as they are engaged and propelled forward by belt 59. Advancing with belt 59 (right to left of FIG. 2A), packages A in either line delivered by belt 48 and 48' follow the contour of the nearby guide 60 or 61. The converging guides 60, 61 together "funnel" the packages into a single line on belt 59 extending beyond the throat outlet of the two guides.

It should be noted that package interference, one with another, of the two conveyor lines is avoided by the chains 33 and 33' having the lugs 43 thereof in a staggered or out-of-phase relationship. Referring to the plan view in FIG. 2, the several lugs 43 are fabricated into each chain 33, 33' at the same amount of spacing one to the other; however, chain 33 is advanced or retarded, as the case may be, about ½ of the amount of space between the lugs 43 from the chain 33'. That is to say, the lug spacing of the chain 33 is 180° out of phase with the spacing of the lugs in the chain 33'. This phase spacing amounts to a staggered relationship of the lugs as between the two chains. If three or more chains (lines) are used in a line-combiner arrangement, the out of phase relationship should be adjusted between the chain conveyors such that staggering of the packages is a result. By way of further explanation, if the number of second conveyor span or lines 23, 24 is designated as "$n$", the equal spacing between the finger lugs 43 (indicated on FIG. 1 as spacing "X") of the n number of chains 33 is determined as approximately (slightly greater than) $X \neq np$; where "$p$" designates the longitudinal dimension of package A (FIG. 1) as it is disposed on the conveyor belts, such as on 23, 24. In this same respect, the out of phase relationship of the finger lugs 43 of one chain 33 with respect to lugs of the next of the other finger chains is determined: 360° divided by $n$. For instance, if there are three second conveyor lines ($n=3$), the spacing between finger lugs 43 of the chains is: $X \neq 3p$ or approximately three times the longitudinal dimension of the package A; and the three finger chains 33 of this example are run with the lugs out of phase with each other by an amount of 360° divided by 3; or 120°. The guide rod configuration for three lines over the final conveyor 59 would be about the same as is shown on FIG. 2A; that is, the middle line of a system having three of the conveyors 48 delivering packages to belt 59 would line up with the throat outlet of the guide rods 60, 61 over conveyor 59, and the one guide rod 61 would single line the top line of packages from conveyor 48' and the other guide rod 60 would single line the bottom line of packages from conveyor 48. As the number "$n$" increases, i.e., the number of lines increases above three, further guide rod means, such as 60 and 61, would be added over conveyor 59 to merge the lines of packages into a single line thereon.

Figure 6:
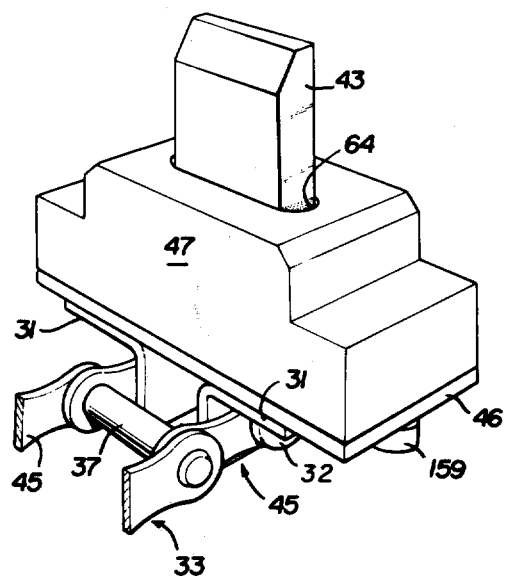
FIG. 6 is a perspective view of a link segment of the finger chain of the invention including the spring loaded lug element thereof.
Figure 7:
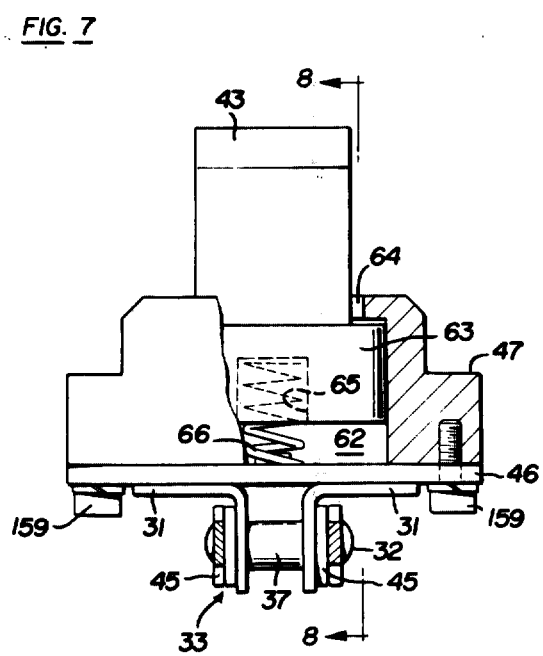
FIG. 7 is a front elevational view of the finger element shown on FIG. 6, partly broken away and in section.
Figure 8:
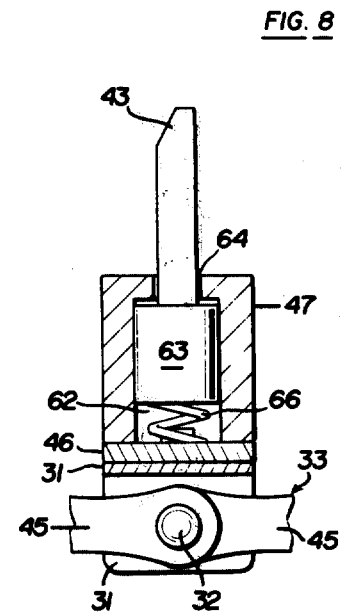
FIG. 8 is a side sectional elevational view, taken along line 8—8 on FIG. 7.

Referring to FIGS. 6–8, the finger lug device 43 is shown fabricated into a link 45 of a chain such as 33 or 33' by the flared brackets 31 which are received by a pin 32 of the chain link and held in spaced relation by the chain roller 37. The brackets 31 are welded to a bed plate 46. A cylinder housing 47 is bolted at 159 onto the sides of bed pate 46 to provide a cylinder chamber 62 in which a plunger 63 is assembled for movement toward or away from the bed plate 46. Plunger 63 is rigidly connected with finger lug 43 which protrudes from housing 47 through the top slot opening 64. Plunger 63 has an axially bored recess 65 in its bottom end face which receives a coil spring 66 compressed between the plunger 63 and bed plate 46. Lug 43 is normally held fully extended by spring 66. In the event the lug 43, traveling in extended position (FIG. 8) into the upper reach of chain 33 is brought into slot 44 such that it engages the underside of a package, the lug 43 will yield downwardly by compressing motion of spring 66 due to the package interference, and stay compressed as lug 43 slides along the under surface of the package. As was earlier mentioned, at the point of transfer engagement, lug 43 and chain 33 are traveling faster than the linear speed of the infeed conveyor belts 11, 12. This speed differential will cause the lug 43 to catch up with a downstream package and contact its back surface to propel it in the manner described earlier. Placing the package under positive engagement and control of a lug 43 will assure the package is oriented in staggered array with respect to packages under control of the other line, i.e., chain 33'.

As shown on FIGS. 1 and 3–5, the conveyor segments are provided with longitudinal guide bars 67 and 68 spaced laterally by the upright supports 69 so as to provide a path therebetween a slight bit wider than the package A. The supports are fastened in standards 70 on the top plate 41 of the conveyor frame by known suitable means, such as stud bolts or the like. To be included in mounting the guide bars is a lateral adjusting feature (not shown) to enable a change in width of package handled by the invention. Since adjustments are well within the skill of those in the art and would be readily understood by them, the adjustment is not specifically disclosed herein.

Having described a single embodiment of the invention, including the best mode therefor, it should be apparent that the invention is not restricted to the embodiment shown, but that many alterations and modifications may be made by those skilled in the art without departing from the spirit and scope of the invention as hereinafter defined by the appended claims, in which the invention is claimed as follows:

We claim:

1. A package handling apparatus for combining a plurality of lines of packages into a single line comprising plural infeed conveyors each supporting a line array of randomly spaced package articles, means connected to drive the infeed conveyors at the same speed in a common direction, individual endless finger chains for each infeed conveyor, each said chain carrying plural fingers spaced along the chain an amount at least two times said package article length, means supporting each of said individual chains adjacent the end of the infeed conveyors such that along its upper reach of said path the fingers thereof protrude above the infeed conveyor surface level for engaging packages thereon, a second conveyor span adjacent the downstream end of each infeed conveyor and at a level relative to said infeed conveyor for transferring package articles from the former to the latter and supporting them on the latter throughout its travel below the level of the protruding fingers, means connected to drive each of the second conveyors in the same direction as the infeed conveyors, means connected to drive each of the individual chains at a speed greater than the speed of the infeed and second conveyors, respectively, whereby the protruding fingers engage and control the spacing of said articles while on the second conveyor, and third conveyor means aligned to receive said spaced articles from the second conveyors, and including means engaging articles received from said second conveyors and guiding them into a single line thereon; said means comprising a pair of opposed converging arcuate guides, means mounting the guides in stationary position over the surface of the third conveyor receiving the packages, each guide extending from its one end near the downstream end of a second conveyor to overlie the third conveyor and its other end in a spaced apart relationship from the other opposite guide defining a single package outlet passage for guiding packages delivered from the individual second conveyors along the third conveyor toward each other and funnel the packages through the outlet in a single line on the third conveyor.

2. A package handling apparatus for combining a plurality of lines of packages into a single line comprising plural infeed conveyors each supporting a line array of randomly spaced package articles, means connected to drive the infeed conveyors, individual endless finger chains for each infeed conveyor, each said chain carrying plural fingers spaced along the chain an equal amount at least two times said package article length as disposed on the conveyor, means supporting each of said individual chains for travel in an endless reversing path including upstream and downstream end turns, respectively, the upstream end turn portion being adjacent the downstream end of the infeed conveyors such that along its upper reach of said path the fingers thereof protrude above the infeed conveyor surface level for engaging packages thereon, a second conveyor span adjacent the downstream end of each infeed conveyor and at a level relative to said infeed conveyor for transferring package articles from the former to the latter and supporting them on the latter throughout its travel below the level of the protruding fingers, the means supporting said individual chains providing the equally spaced fingers thereof, one to the other, in a staggered array across the span of said second conveyors, means connected to drive each of the second conveyors in the same direction away from the infeed conveyors, means connected to drive each of the individual chains at a speed greater than the speed of the infeed and second conveyors, respectively, whereby the protruding fingers engage and control the spacing of said articles on said second conveyors, and third conveyor means aligned to receive said spaced articles in staggered relationship from the second conveyors, and including guide means engaging articles received from said second conveyors and guiding them into a single line thereon.

3. The package handling apparatus of claim 2 in which the second conveyors is comprised of $n$ number of said conveyors, the packages have a common length dimension $p$, the spacing between the several finger lugs on each of the finger chains being designated X is determined as approximately $X \neq np$.

4. The package handling apparatus of claim 3 in which the staggered array of fingers equally spaced in accordance with the formula $X \neq np$ is provided by one said chain being out of phase with the next of the plural chains $360°/n$.

5. The package handling apparatus of claim 2 including individual fourth conveyors for each of said second conveyors disposed coextensive with a terminal portion of the span of said second conveyor and said finger chains for engaging packages thereon and delivering them to said third conveyor means, a drive means connected to said fourth conveyors running them in the same direction and at a greater linear speed than the linear speed of said individual finger chains, whereby packages are accelerated and propelled away from the fingers near the downstream reversal thereof in their said endless reversing path by engagement with said fourth conveyor thereby preventing interference between a package and finger at the downstream reversing path for the latter.

6. A package handling apparatus for combining two lines of packages into a single line comprising
two infeed conveyors each supporting a line array of randomly spaced package articles,
means connected to drive the infeed conveyors,
a second conveyor span adjacent the downstream end of each infeed conveyor and at a level relative to said infeed conveyor for transferring package articles from the former to the latter and supporting them on the latter,
means connected to drive each of the second conveyors in the same direction away from the infeed conveyors,
individual endless finger chains for each infeed and second conveyor combination, each said chain carrying plural fingers spaced along the chain an amount at least twice the lengthwise dimension of said packages as supported on the second conveyor,
means supporting each of said individual chains adjacent the end of one of the infeed conveyors and with the fingers of one of said chains 180° out of phase with fingers of the other of said chains, the fingers along the upper reach of the path of each of said chains protrude above the surface level of the infeed and second conveyors for engaging packages thereon,
means connected to drive each of the individual chains at a speed greater than the speed of the infeed and second conveyors, respectively, whereby said protruding fingers engage and control the spacing of said articles while on each of the second conveyors,
third conveyor means aligned to receive both lines of staggered, spaced articles from the second conveyors, and
including means engaging both lines of articles received from said second conveyors and guiding them on said third conveyor surface into a single line thereon comprising
a pair of opposed converging arcuate guides, means mounting the guides in stationary position over the surface of the third conveyor receiving the packages, each guide extending from its one end near the downstream end of a second conveyor to overlie the third conveyor and its other end in a spaced apart relationship from the other opposite guide defining a single package outlet passage for guiding packages delivered from the individual second conveyors along the third conveyor toward each other and funnel the packages through the outlet in a single line on the third conveyor.

7. The package handling apparatus of claim 6, wherein said means guiding said lines of articles from the second conveyors to a single line on the third conveyor comprises a pair of opposed converging arcuate guides, means mounting the guides in stationary position over the surface of the third conveyor receiving the packages, each guide extending from its one end near the downstream end of a second conveyor to overlie the third conveyor and its other end in a spaced apart relationship from the other opposite guide defining a single package outlet passage for guiding packages delivered from the individual second conveyors along the third conveyor toward each other and funnel the packages through the outlet in a single line on the third conveyor.

* * * * *